March 19, 1940.  T. A. PETERMAN  2,194,323
VEHICLE SUSPENSION
Original Filed July 19, 1937
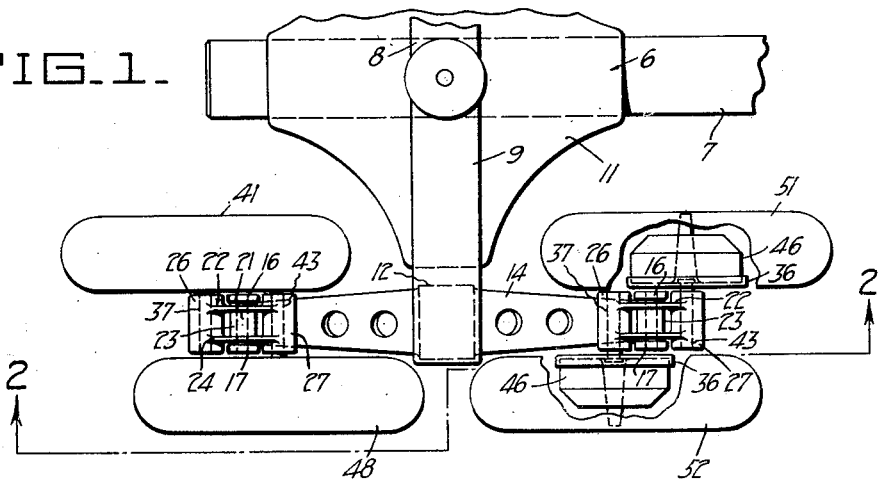
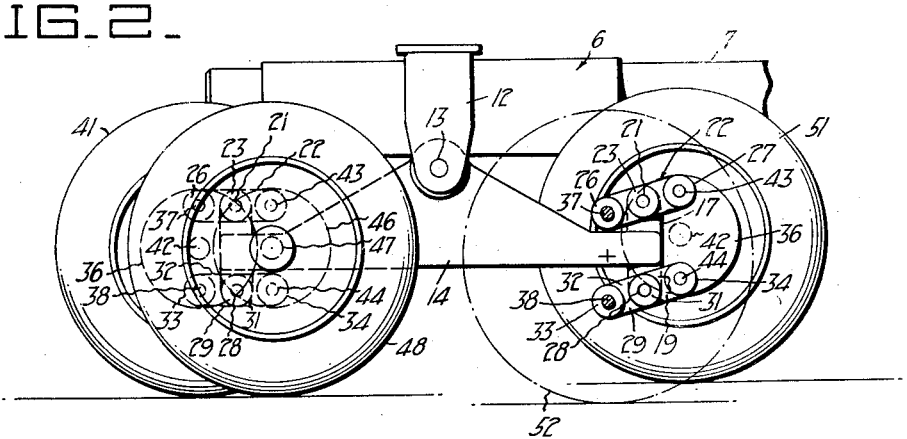
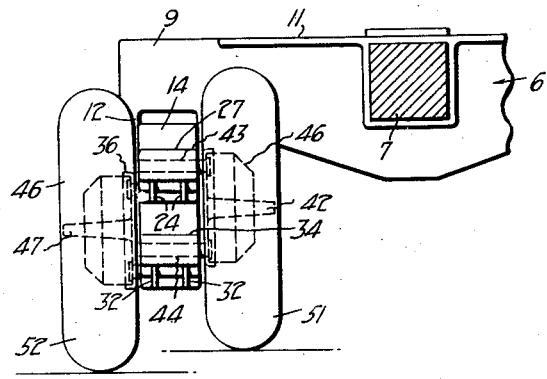
INVENTOR.
Theodore A. Peterman
BY
ATTORNEY.

Patented Mar. 19, 1940

2,194,323

UNITED STATES PATENT OFFICE 2,194,323

VEHICLE SUSPENSION

Theodore A. Peterman, Tacoma, Wash.

Application July 19, 1937, Serial No. 154,415
Renewed June 17, 1939

6 Claims. (Cl. 280—81)

My invention relates to a vehicle adapted to traverse uneven terrain and is especially concerned with means for supporting such vehicles upon a plurality of ground-engaging wheels with a substantially equalized or uniform distribution of load to all of the supporting wheels, despite variations in superficial contour of the ground traversed. Vehicles of this general character are disclosed in my copending application entitled "Vehicle," Serial No. 137,107, filed April 15, 1937, of which this application is a continuation in part.

An object of the vehicle suspension of my invention is to provide a means for equalizing the load upon all of the plurality of ground-engaging wheels of the vehicle despite variations in the contour of the terrain over which the vehicle is operating.

Another object of my invention is to provide a vehicle suspension in which simple link mechanisms are utilized for equalization, yet in which an ample range of wheel movement is provided without material error due to articulation of the links.

Another object of my invention is to provide a vehicle suspension in which the supporting wheels are very firmly braced to the main frame.

A further object of my invention is to provide a vehicle suspension in which the various wheels will encounter irregularities in the ground at different times in order to distribute the shock to the main frame.

A further object of my invention is to provide a vehicle suspension employing a plurality of wheels in which the arrangement is compact.

The foregoing and other objects are attained in the embodiment of the invention illustrated in the drawing, in which:

Figure 1 is a plan, certain portions being in section, of a vehicle suspension constructed in accordance with my invention, a symmetrical half of the vehicle being broken away to reduce the size of the figure.

Figure 2 is a slide elevation of the structure disclosed in Figure 1.

Figure 3 is an end elevation of the structure shown in Figure 2.

In its preferred form, the vehicle suspension of my invention includes a main frame on which is mounted an equalizer beam carrying, at its opposite extremities, centrally pivoted pairs of equalizer links corresponding ends of which are connected by hangers from each of which projects a spindle for a ground-engaging wheel, the spindles being so arranged that one tandem pair of wheels adjacent the frame is spaced apart longitudinally a greater distance than the remaining tandem pair of wheels which is more remote from the frame.

In a typical embodiment, the vehicle suspension of my invention includes a main frame 6 which incorporates a reach rod 7, from which extends a pair of outriggers 8 and 9. The outriggers extend transversely of the reach rod 7 and preferably are heavily braced with respect thereto by a bolster frame 11 which encompasses not only the reach rod 7 but also the outriggers, and which spans diagonally between the walls of these members in order to provide an extremely rigid main frame. A typical outrigger 9 terminates in a depending yoke 12 through which a transverse, generally horizontal pivot pin 13 passes.

Pivotally mounted on the pin 13 and thus articulated with respect to the main frame 6 is an equalizer beam 14 which preferably is of box construction and extends symmetrically forwardly and aft of the pivot connection or pin 13. Since the equalizer beam 14 is substantially symmetrical it affords an equal distribution of stresses on opposite sides of the pin 13, although the pin can be located forwardly of, or behind, a central point of symmetry in order to give a different distribution of forces if desired.

The extremities of the equalizer 14 terminate in an upturned pair of forks 16 and 17 and a downturned pair of forks 18 and 19. Centrally mounted upon a pivot pin 21 passing through the upper forks 16 and 17 is an equalizing link 22 comprising a central boss 23 journaled upon the pin 21 and webs 24 extending to hubs 26 and 27 preferably equidistantly spaced from the central hub 23, although they can be differently spaced if something other than equal distribution of force is required.

Correspondingly centrally mounted upon a pin 28 passing between the downturned forks 18 and 19 is a lower equalizing link 29 having a central hub 31 encompassing the pin 28 and having webs 32 extending to the terminal hubs 33 and 34. In general, the upper equalizing link 22 is identical with the lower equalizing link 29.

The corresponding hubs 26 and 33 are preferably interconnected by a hanger 36 which conveniently can take the form of a standard heavy metal brake plate journaled to receive pivot pins 37 and 38 projecting from the hubs 26 and 33 to one side of the equalizing beam 14. Since the distance between the axes of the pins 37 and 38 is substantially the same as the distance between the axes of the pins 21 and 28, there is provided a parallel motion so that all points on the brake plate 36 or hanger move in similar arcs.

To receive a ground-engaging wheel 41 there is provided a spindle 42 projecting from a convenient part of the hanger on one side of the beam 14 and toward the reach rod 7. Similarly, the hubs 27 and 34 are provided with pivot pins 43 and 44 which are journaled in a brake plate 46 constituting a hanger moving in parallelism with the linkage and itself carrying a wheel spindle 47 which provides the mounting for a ground-engaging wheel 48. A similar arrangement is provided on the other side of the outrigger 9 for mounting a ground-engaging wheel 51 and a ground-engaging wheel 52 so that the ground-engaging wheels 41 and 51 forming a tandem pair adjacent to the frame 6 are relatively widely spaced apart longitudinally of the frame to accommodate and allow ample clearance for the outrigger 9 and the bolster frame 11, so that adequate diagonal bracing for rigidity of the frame can be provided without interference with the wheels 41 and 51.

The other tandem pair of wheels, constituted by the ground-engaging wheels 48 and 52 are spaced apart longitudinally somewhat less, since they need not provide clearance for the outrigger 9 nor any bracing corresponding to the bolster frame 11, but especially so that as the vehicle advances in a direction generally parallel to the direction of extent of the reach rod 7 the leading wheels 51 and 52, for example, will encounter a transverse obstruction at different times rather than simultaneously as would be the case if the wheels 51 and 52 were in transverse alignment. Similarly, the wheels 41 and 48, being out of transverse alignment, do not encounter a transverse obstruction simultaneously, but go over it successively. In this fashion full advantage is taken of the transverse equalization provided by the equalizing links such as 22 and 29, and also of the longitudinal equalization provided by the equalizing means 14; whereas in a construction in which the wheels are transversely aligned, even though transverse equalization be provided, such equalization is often not effective because both transversely aligned ground-engaging wheels will encounter a transverse obstruction simultaneously.

With the arrangement of equalizing links shown, the twisting moments about a longitudinal axis are minimized since such axis substantially coincides with the central axis of the equalizing beam 14 and the overhang of the wheels from their point of support on such beam is relatively small. Not only is this an advantage in having the wheels 41 and 48, for example, relatively close together transversely of the vehicle, but it avoids deleterious movement due to short radii of the linkages because such links move in longitudinal or fore-and-aft planes wherein arcuate movement of the wheels is immaterial, so long as transversely of the vehicle, the wheels move in vertical planes.

There is thus virtually no distortion of the tire casings and an adequate vertical movement can be provided without introducing any transverse thrusts. The turning moment about a longitudinal axis coincident with the beam 14 is relatively small, and is compensated for within the equalizing link system itself, so that there is no resultant moment or twist imposed upon the equalizing means 14. At the same time, the wheels 41, 48, 51 and 52 are very compactly arranged so that they do not occupy an excessive amount of room, yet adequate space is left for the outrigger 9 and the bracing comprised in the bolster frame 11.

I claim:

1. A vehicle suspension comprising a frame, an equalizer beam mounted on said frame, an equalizer link substantially parallel to said beam and centrally pivoted thereto adjacent one end thereof, a wheel spindle articulated with one end of said link, and a second wheel spindle articulated with the other end of said link.

2. A vehicle suspension comprising a pivoted beam, an equalizer link centrally pivoted to said beam adjacent one end thereof, the axis of the pivot of said link being parallel to the axis of the pivot of said beam, a wheel spindle on one side of said beam connected to one end of said equalizer link, and a second wheel spindle on the other side of said beam connected to the other end of said equalizer link.

3. A vehicle suspension comprising a frame, an outer pair of parallel wheel spindles spaced a predetermined distance apart, an inner pair of parallel wheel spindles spaced a greater distance apart, an equalizer link at its extremities connected to one spindle of said outer pair and to one spindle of said inner pair, another equalizer link at its extremities connected to the other spindle of said outer pair and to the other spindle of said inner pair, and a connection between both of said equalizer links and said frame.

4. A vehicle suspension comprising an equalizer beam, a pair of equalizer links centrally pivoted on said beam, a hanger pivotally connected to both of said links at one end thereof, a wheel spindle projecting from said hanger on one side of said equalizer beam, a second hanger pivotally connected to both of said links at the other end thereof, and a second wheel spindle projecting from said second hanger on the other side of said equalizer beam.

5. A vehicle suspension comprising a frame, a tandem pair of ground-engaging wheels adjacent said frame, a second tandem pair of ground-engaging wheels remote from said frame and out of transverse alignment with said first pair of wheels, means for effecting transverse equalization between corresponding wheels of said pairs, and means for effecting longitudinal equalization between said transverse equalization means and said frame.

6. A vehicle suspension comprising a frame including a transverse outrigger, a tandem pair of ground-engaging wheels adjacent said frame and spaced widely apart to clear said outrigger, a second tandem pair of ground-engaging wheels remote from said frame and spaced closely together, transverse equalizing means between corresponding wheels of both of said pairs, and longitudinal equalizing means between said transverse equalizing means and said outrigger.

THEODORE A. PETERMAN.